(12) United States Patent
Dittmann et al.

(10) Patent No.: US 7,146,859 B2
(45) Date of Patent: Dec. 12, 2006

(54) METHOD FOR SIMULATION OF THE LIFE OF A VEHICLE

(75) Inventors: Klaus-Joerg Dittmann, Nagold (DE); Erich Neuwirth, Bad Liebenzell (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 11/236,615

(22) Filed: Sep. 28, 2005

(65) Prior Publication Data

US 2006/0069962 A1    Mar. 30, 2006

(30) Foreign Application Priority Data

Sep. 28, 2004   (DE) ...................... 10 2004 046 912

(51) Int. Cl.
*G01M 17/00*   (2006.01)
(52) U.S. Cl. ...................................... 73/669
(58) Field of Classification Search ............... 73/11.04, 73/11.07, 11.09, 669, 865.6; 701/29, 30, 701/31; 702/33, 34, 35, 113
See application file for complete search history.

(56) References Cited

U.S. PATENT DOCUMENTS

| 4,263,809 | A | * | 4/1981 | Petersen et al. ............... 73/798 |
| 4,981,034 | A | * | 1/1991 | Haeg .......................... 73/118.1 |
| 5,465,615 | A | * | 11/1995 | Petersen et al. ............ 73/118.1 |
| 5,533,403 | A | * | 7/1996 | Haeg et al. .................... 73/669 |
| 5,610,330 | A | * | 3/1997 | Fricke et al. ................. 73/146 |
| 5,633,464 | A | * | 5/1997 | Haeg et al. .................... 73/669 |
| 5,750,890 | A | * | 5/1998 | Fricke et al. ................. 73/146 |
| 5,900,542 | A | * | 5/1999 | Fricke et al. ................. 73/146 |
| 6,134,957 | A | * | 10/2000 | Fricke et al. ................. 73/146 |
| 6,257,055 | B1 | * | 7/2001 | Haeg et al. ................ 73/118.1 |
| 6,640,638 | B1 | * | 11/2003 | Haeg et al. .................... 73/669 |
| 6,725,168 | B1 | * | 4/2004 | Shiraishi et al. .............. 702/81 |
| 2003/0088373 | A1 | | 5/2003 | Fields et al. |
| 2003/0229476 | A1 | | 12/2003 | Naganarayana et al. |
| 2006/0059993 | A1 | * | 3/2006 | Temkin et al. ................ 73/669 |

\* cited by examiner

*Primary Examiner*—Eric S. McCall
(74) *Attorney, Agent, or Firm*—Crowell & Moring LLP

(57) ABSTRACT

In a method for simulation and assessment of the life or dynamic strength of components of a vehicle, the vehicle is subdivided into individual components and these components are modeled by means of a finite element method. The finite element models of the individual components are collated for simulation at interfaces. Externally introduced forces are measured on the vehicle, or are simulated, and the forces which occur at the interfaces or at specific points within the components are calculated in order to determine the weakest points from the dynamic strength point of view in the overall model. Elastic structures are modeled at the interfaces in order to simulate the real flexibility or the dynamic transmission response of the vehicle structure, and masses and/or stiffness data and/or elastomer bearing data for the elastic structures are taken into account in the model.

17 Claims, 2 Drawing Sheets

METHOD FOR SIMULATION OF THE LIFE OF A VEHICLE

BACKGROUND AND SUMMARY OF THE INVENTION

This application claims the priority of German patent document 10 2004 046 912.1, filed Sep. 28, 2004, the disclosure of which is expressly incorporated by reference herein.

The invention relates to a method for simulation and assessment of the life or dynamic strength of components of a vehicle by means of a finite element analysis. In this process, the finite element models of the individual components are collated at interfaces, for the simulation. Forces are applied externally to the vehicle at these interfaces or at specific points within the components of the vehicle in order to determine the weakest points in the overall model with respect to dynamic strength.

Methods for computer simulation are advantageous because they shorten the development procedures for vehicles, especially for motor vehicles. Particularly in the case of crash simulation, they reduce the development costs. As a result of continuously increasing computer performance, the static and dynamic strength of components can now be calculated well by means of a finite element method (FEM). The known finite element networks can be used to model components completely and in detail, making it possible, in particular, to determine the stress distribution, in bearings or at interfaces between the components.

German patent document DE 199 24 207 A1 discloses a method for testing the dynamic strength of fuel tanks. In this case, the behavior of the tank is investigated when external forces are applied, such as those which occur in the event of accidents. This is done using a computer simulation based on finite element analysis extended by methods from multiple body simulation and contact mechanics. Since the thickness of the tank wall is highly dependent on the tank location, depending on the production, the FEM is formed from elements of different thickness. This accident simulation differs from the live simulation, however, in that a destructive force is introduced to the fuel tank only once in the crash simulation.

One the other hand, during live simulation, external forces are introduced to the vehicle at different frequencies over a lengthy period, in order to check the strength of a vehicle during continuous operation. Frequencies which are normally used for dynamic strength testing (relative to the forces and moments which are introduced to a vehicle model or model element externally) are, for example, in the range from 0.08 to 50 Hz.

German patent document DE 102 22 700 A1 discloses an optimization method for a crash simulator, which uses finite element methods to simulate the vehicle or parts of it. The dimensions of the metal sheets which are used for the bodywork are calculated on the basis of the crash simulation. In this crash simulator, an approximation model is matched to the real vehicle by optimization of a set of parameters so as to satisfy a termination condition. A plurality of iteration methods and equations are proposed for the approximation model for the crash simulation, in order to generate optimal parameters. Since elastic structures are irrelevant in this case, this method is not suitable for live simulation.

German patent document DE 100 23 377 C2 discloses a method for increasing the performance of a computer facility for finite element simulation. In this case, a numerical calculation method has been developed further in order to make it possible to carry out simulations such as these efficiently. However, the specific application of such simulators for vehicles is irrelevant.

One object of the present invention is to provide a method for simulation and assessment of the live or dynamic strength of components of a vehicle, which provides an optimized vehicle model in order to achieve an optimum simulation of the vehicle dynamic strength.

This and other objects and advantages are achieved by the method according to the invention, in which the vehicle model or model element is matched to the real vehicle in a plurality of iteration steps by introducing external forces that are selected not only on the vehicle model or model element but also on the real vehicle. The forces which occur at the interfaces or at specific points within the components on the vehicle are compared by means of elastokinematic measurements for the entire vehicle model or model element, and the elastokinematic characteristics of the various elastic structures in the vehicle model or model element are then adapted, such that the vehicle model or model element behaves like the real vehicle at the interfaces or at the specific points within the components with respect to forces/time or movement/time. The iteration steps are repeated in order at the same time to adapt the elastokinematic characteristics optimally for a plurality of interfaces or a plurality of points within the components.

According to the invention, it has been determined that the dynamic strength test carried out so far on the real vehicle can also be carried out by means of a finite simulation. In contrast to the known crash simulations, the vehicle model is subjected to a set of simulated dynamic strength test runs rather than having a destructive crash impulse applied to it. In this case, by way of example, an uneven route is recorded, and its forces and moments acting on the vehicle are detected.

The same dynamic strength driving profiles as already applied to the real vehicle during dynamic strength testing are then applied to the vehicle model or model element in the simulation for dynamic strength testing over a predetermined time period of, for example weeks or days. Forces and moments in a frequency range from, for example, 0.08 to 50 Hertz are introduced to the vehicle model or model element during dynamic strength testing. These frequencies correspond to those which are most damaging to the life or dynamic strength of the real vehicle, and its materials.

In contrast to a crash simulation, the elastic structure of the vehicle chassis, engine suspension or running gear is of major importance when using finite element simulation for dynamic strength testing. As a consequence, the vehicle model or model element must be matched precisely to the real model before the dynamic strength simulation. However, this procedure itself has yielded problems in dynamic strength simulations such as these. According to the invention, an iterative method is now provided for the simulation, in which the parameters for the vehicle model or model element are adapted on the basis of the static finite element model, and the elastokinematic characteristics for the elastic structures are optimized to an ever greater extent in further iteration steps. As a result, the vehicle model or model element is optimally matched to the real vehicle for the simulation.

The elastokinematic characteristics are, for example, the inward-springing characteristic or damper characteristic of the running gear. On the other hand, spring constants and damping characteristics can also be modeled for rubber buffers or other elastic materials. The flexibility of the materials used for components of the vehicle can also be modeled in this way. A vehicle model or model element which has been optimized in this way can be used in the simulation in order to carry out a life test on the individual components of the vehicle on computer systems. This makes it possible to draw conclusions regarding the life of the components, without the need to perform work on test rigs over periods of months, on the real vehicle. Instead of modeling of the entire vehicle, it is also possible to use a vehicle model element (for example, only the running gear), the chassis, the internal fittings or the engine. The forces which act as internal sectional loads on the running gear subsystem are then modeled as external forces, while the dynamic strength test patterns, in the form of road unevenness data, are modeled as an external force from underneath against the running gear.

In conjunction with the method for simulation, provision is made for the vehicle (or parts of it) to be modeled using the finite element method, and for an evaluation algorithm to be carried out in a further step after calculation of the forces and moments, with the evaluation algorithm assessing the life and the dynamic strength of the individual vehicle parts. By way of example, this assessment calculates the weakest point in the investigated vehicle model or model element; and, with optimum matching, leads to the same results as a test on the real test rig with the real vehicles. In both cases, potential damage points are determined, for example, on the chassis and at interfaces between the engine, transmission and vehicle bodywork.

This is referred to as a hybrid method for determination of the dynamic strength. It is subdivided into a step for determination of the dynamic overall range of vehicle sectional loads using a multiple body simulation, and a second step of subsequent dynamic strength analysis by means of a software program system.

This results in statements about the reliability of specific components of the vehicle and, in turn a calculation of the damage distribution on the bodywork of the vehicle. The method is particularly suitable for checking damage at weld points at interfaces between individual components. A further potential results from the virtual matching to a real test rig for life determination on the vehicle, making it possible to determine the movements during operation of the individual operating pistons of the real simulator in order to produce specific forces on the vehicle. These values can be used particularly well as manipulated variables for the movements during operation for testing of real components on the vehicle or vehicle subsystem. These manipulated variables for the movements during operation can also be used for multiple component simulation or FEM calculation for life determination.

The described method can be used to simulate dynamic strength during operation of the vehicle even in response to stochastic loads (for example, on poor road surfaces), and their effects on the life of the components. The calculational assessment makes it possible to shorten considerably the time required for life test processes in comparison to the real tests. The simulation makes it possible to save vehicles which are loaded until they become damaged during long-term driving trials on roads and test tracks, or else on a test rig, thus obviating the need to subsequently scrap the vehicle. The aim of the method according to the invention is to improve qualitatively the numerical life prediction by means of a virtual test rig. In particular, the virtual life test rig is matched to the real vehicle by an iterative adaptation process, for this purpose.

The method for simulation and assessment of life and operating strength according to the invention can be matched either to the real vehicle or to the real vehicle test rig, thus resulting in an identical load situation on the vehicle bodywork on the real bodywork test system. The life simulation process carried out by calculation is quicker and more detailed than that on the real bodywork test system. Finite element modeling results in a digital map of the real vehicle prototypes, on demand. The convergence between the results with the digital prototype and the real prototype becomes ever better by means of the simulation according to the invention over the development time period, with elastic structures being adapted by changing parameters such that the real vehicle model is optimally simulated. Since the finite element models for individual vehicle components are stored in libraries and can thus be used repeatedly, it is also possible to carry out reliable comparisons for planned vehicle variants, even in the development stage.

The vehicle model or model element includes elastic structures for optimum modeling of the real non-linearities between the individual components. In this case, during the multiple body simulation, the elastic structures are created at the interfaces between the components which are modeled by the finite element method. Since the inclusion of the elastic structures in the finite element models requires additional computation time, the elastic structures are preferably created and matched to the interfaces in such a way that the various elastic effects are implemented in a generalizing form in the elastic structure at the interface. For this reason, the vehicle model or model element must be matched to the real vehicle by means of a plurality of iteration steps using the iteration process according to the invention. For this purpose, the elastic structures are first reduced by calculation to rigid structures of the simulation, by setting the elasticity to an infinite value.

The static vehicle model produced in this way is first of all roughly matched to the real circumstances. Thereafter, the elasticities are then adapted by means of a numerical method, so that the vehicle model is optimized for the simulation. Various test data records (for example, road data, driving over curb stones and the like) are available to the simulator for this purpose. Since the real vehicle and the real test rig with the vehicle arranged on it were tested using the same road data, the reactions of the vehicle structure and the forces on the real interfaces are known. The simulated vehicle model is now matched to the real movement and force profiles in the real elastic structures. For this purpose, a plurality of test data records are offered to the simulator, with the elasticity parameters of the elastic structures being changed on each occasion, so that the vehicle model converges with the real structures. Correlation investigations are carried out using standardized test rig models. These investigations are carried out in the quasi-static range of elastokinematic at very low stimulation frequencies of the vehicle model, and in the dynamic range with the aid of deterministic, real and virtual trial runs with the vehicle. The measurement results from the real measurements on the vehicle can thus be used optimally for the iteration of the vehicle model.

The elastic structures are adapted, for example, using parameters such as masses, coefficients of inertia, stiffness characteristics etc., which, for example, have been predetermined on the basis of a real rubber bearing or a real suspension leg, and which are still being adapted during the simulation. In this case, spring characteristics can be adapted very well by the adaptation of the elastic structures in quasi-steady-state calculations. Elastic structures can simulate the elasticities of the front and rear axle structure or the circumstances at wheel hubs and shock-absorber units.

Once the rigid vehicle model has been calculated thoroughly in the first step, the reaction of the vehicle bodywork for the dynamic load situation can be measured with simultaneous inward springing or with vertical or horizontal dynamic load situations, on the basis of which the mass, inertia and damping characteristics of the model can then be adapted. The vehicle model and model element is then validated in a final iteration step. For this purpose, a real motor vehicle (or a ship or an aircraft) which is fitted specifically with measurement sensors, is checked for the dynamic strength loads by means of dynamic stimulation. The results obtained in this way are also used to adapt the coefficients for the life or dynamic strength calculations for the simulator, so that the life and dynamic strength calculations approximate reality.

The following points must be unambiguously defined for the life calculation. The development state of the vehicle on the test rig and its components must be documented with respect to the parameters. The transmission response of all the relevant components, such as the suspension/shock absorbers and elastomer bearings must be recorded. If necessary, complex components must be remeasured in their static and dynamic operating ranges. The results obtained in this way can be stored in a digital database and are likewise available for further life investigations for other vehicle types.

The cylinder movements introduced into the running gear must be defined unambiguously in terms of the magnitude and direction in order to simulate the dynamic load situation on a poor road surface for the simulation. The stimulation while driving over a poor road surface is produced both in the real test rig and in the simulation model by means of test cylinders via which the test rig is connected to the traffic model. The predetermined deflections of these test cylinders act on the vehicle as if it were traveling over a poor road surface. For this purpose, the test cylinders must apply forces to the vehicle model. On the other hand it is also possible to introduce torques (for example, to the wheel suspension on the vehicle model) by means of specific test cylinders which can rotate. Finally, the static load distribution within the vehicle must also be measured so that any prestresses occurring at specific interfaces and in the area of the elastic structures can be calculated correctly.

According to another embodiment of the invention, the forces and moments are introduced into the vehicle via simulated movement controllers which are clamped in between the fixed foundation and the interfaces and operate in a translational or rotational direction with respect to the interfaces of the vehicle model element or model. The movement distances are calculated from the simulation of the movement distances required for the movement controllers, in order to apply the real force and/or moment load to the vehicle model or model element.

The method for simulation and assessment of the life and dynamic strength can also be used, according to the invention, to calculate the movement distances of the movement controller (such as the test cylinders). By way of example, the movement distances for the movement controllers for a force and moment load on the vehicle can be produced in order to provide a comparative simulation on driving over an uneven road. On the real test rig, an uneven road is simulated by hydraulic test cylinders producing movement stimuli in one or more directions statically and dynamically from the exterior, acting on the vehicle running gear. These impacts are achieved by extending the movement controllers in the form of an impulse. Different movement distances are required for the simulation depending on the characteristic of the movement controllers, for example movement pressure and the diameter of the cylinders.

In order to reduce this complex process for the real test rig, the computer simulation method can calculate the required forces on the basis of driving over this uneven road, and can calculate the movement distances for the movement controllers. For this purpose, the method for simulation of the life or dynamic strength calculates the necessary movement distances for this purpose from the movement controller geometry and from the drive pressures for movement controllers (for example, the hydraulic pressure or the current for electric motors), in order to simulate precisely and exactly the same movement distance with respect to the force and moments as that which would occur when driving the real vehicle over this uneven route. In this way, the method for simulation and assessment can be used not only for calculation of the life and dynamic strength but also for designing the real test rig for the vehicle or vehicle subsystem.

In one preferred embodiment of the invention, the position of the vehicle model or model element is defined in space by defining the wheel holder interfaces at the movement controllers. One problem that arises in a virtual simulation system is that the vehicle model becomes desynchronized when forces and moments are applied to the running gear, and departs from the simulation layout in an uncontrolled manner. Accordingly, for this purpose, the vehicle is fixed on the real test rig in a moving manner (for example, in the area of the bumpers and wheel holder interfaces); that is, it is restrained. Since the simulation is an unrestrained configuration with external movement stimulus, the wheel hub forces are produced as a reaction during the simulation. However, in order to prevent uncontrolled effects in the simulation in this case, the vehicle model is fixed, by calculation, on the movement controllers in the area of the wheel holding interfaces.

The method for simulation is designed such that horizontal deceleration and/or acceleration forces can be introduced to the vehicle model. For this purpose, the movement controllers introduce deceleration and acceleration forces in the horizontal direction into the vehicle model. In this case, the movement controllers are attached to the front structure and in the rear area of the bumper in the horizontal direction, and the forces and moments are calculated there.

The invention provides a virtual test rig which can be used for dynamic strength testing or live simulation for the overall vehicle by numerical simulation. Such simulation is used in particular during vehicle development to identify weaknesses in its design, even in this early phase. For this purpose, dynamic strength simulations or real test results from previous development phases with other vehicles can be used by storing this data in a library or in a digital mock-up system. The virtual test rig iteration according to the invention simulates the force/moment situation on the vehicle, and it is thus possible to calculate the internal forces between the individual components within the vehicle. The measures developed from this result in increased maturity in the development of new complex vehicle types.

The invention also provides software program products which include the assessment method for simulation of the life and dynamic strength of components according to the present method. Software program products such as these include floppy disks, memory chips and entire computer systems with program elements of the method for simulation.

Other objects, advantages and novel features of the present invention will become apparent from the following detailed description of the invention when considered in conjunction with the accompanying drawings.

DETAILED DESCRIPTION OF THE DRAWINGS

Figure 1:
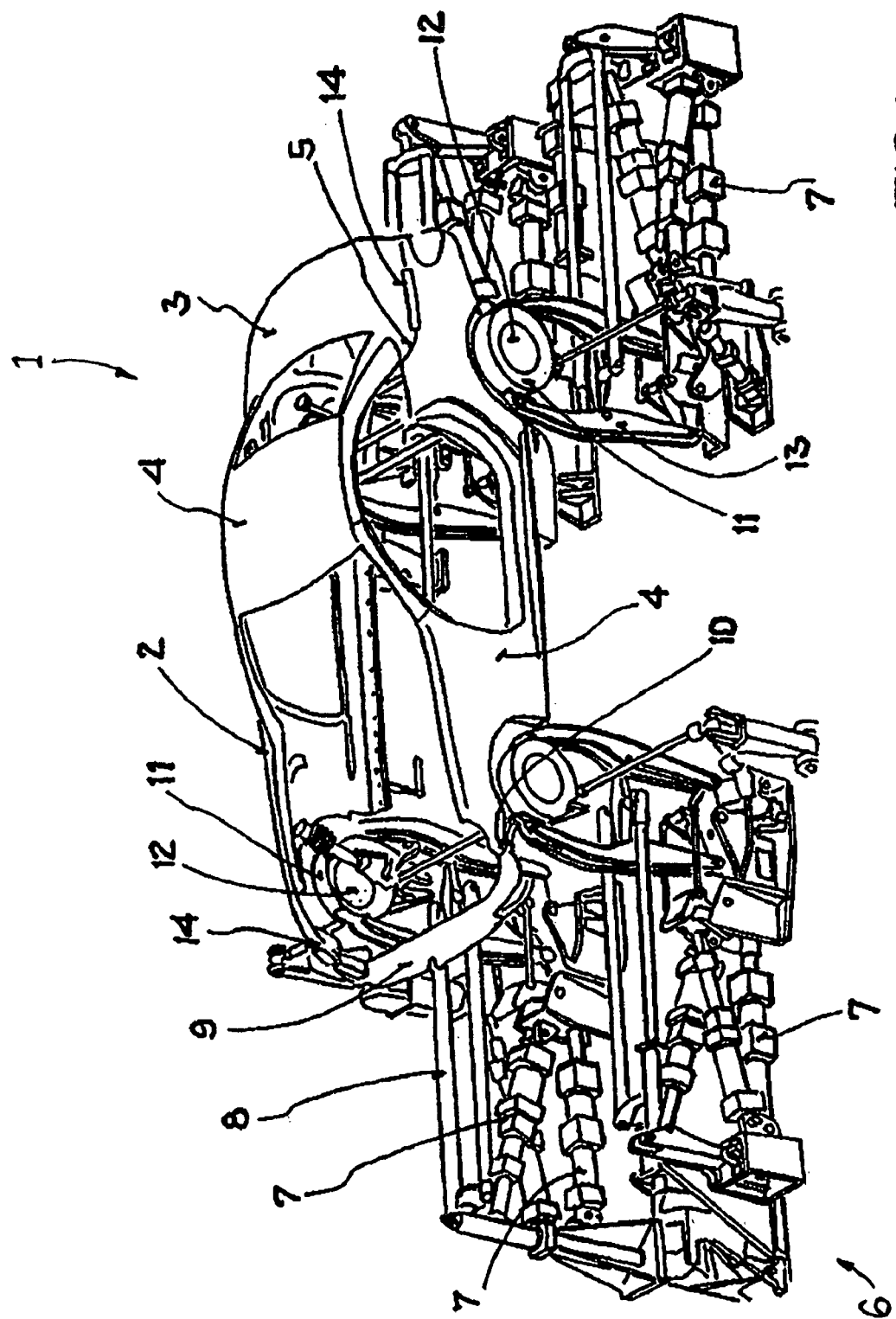
FIG. 1 shows an overview of a virtual vehicle model for simulation of the life of the components according to the present invention.

In the method according to the invention, for simulation and assessment of the life and dynamic strength of components of a vehicle, a user interface 1 is provided for a simulation computer, on which the simulation is prepared by means of visual (graphically depicted) symbols. The simulation calculations are then carried out, subject to the separately entered constraints for the static structure of the vehicle model 2, on the basis of this visual overall view. A vehicle model 2 composed of individual components 3 and 4 is formed on the user interface 1, each of which components 3 and 4 can be selected in a library, and can be collated on the user interface 1.

Each of these components 3, 4 is modeled by means of a finite element method, so that forces and moments can be displayed within the components 3, 4. The forces and moments can be checked at the interface 5 between the components 3 and 4. On the other hand, elastic structures can also be inserted at the interface 5, in order to simulate the elastic or non-linear response of the components 3 and 4 involved. The vehicle model 2 which is formed by the bodywork components 3 and 4 is placed on a simulated dynamic strength test rig 6. Predefined forces can be introduced into the vehicle model 2 in the simulator by means of the virtual movement controllers 7.

For example, one movement controller 8 can introduce a frontal force into the vehicle model 2. That is, in the simulation, a force is applied to the front of the component 4, via the component 9 and the interface 10 between the components 4 and 9.

Wheel suspension 11 for the vehicle is simulated via elastic structures 12, and a braking force is introduced to the wheel suspension 11 via a torque controller 13. This allows forces and moments to be transmitted via the wheel suspension 11 and the elastic structures 12 to the vehicle model 2. Once the elastic structures 12 have been adapted to the real characteristics of a vehicle, the force and moment transmissions can be simulated very exactly for driving the vehicle over an uneven roadway. The simulator can now calculate the forces and moments when driving for several days over an uneven route, and can calculate the dynamic strength of the individual components 4, 5, 9 by means of additional software. This allows the life of specific components 4, 5, 9 to be calculated within a calculation time which is measured in hours, and is shorter than the real dynamic strength test, whose real life test can last for weeks and months.

The simulator is compared and adapted to the forces which actually occur at the interfaces 5, 9 and the wheel suspensions 11, for adaptation of the elastic structures 12, 14. For this purpose, a plurality of iteration steps are required, with the vehicle model 2 first being driven over uneven ground with a moment frequency of 0.08 Hz (that is, reacting quasi-statically). A first adaptation to the vehicle can thus be carried out during matching of the elastic structures 12, 14 to the real conditions. In further iteration steps, the various elastic structures 12 and 14 are then matched to the real situation in the vehicle, at the interfaces 5, 10, 11.

Once the vehicle model 2 has been matched to the actual conditions in the vehicle, and the test cylinder dimensions and the operating pressures and valve cross-sections of the movement controllers 7, 8 for the virtual movement controllers 7, 8 are known, then deflections can be calculated for each movement controller 7, 8, in order to produce a force at the wheel suspension 11 similar to the forces that occur in actual test conditions or in measurement on wheel suspension systems 11 on real vehicles. The method for simulation and assessment of the dynamic strength of components 3, 4, 9 can therefore also be used for designing the movement controllers 7, 8 on the real test rig 6, so that the movement distances for the real movement controller for construction of the real test rigs 6 can be calculated by previous simulation on the computer.

Figure 2:
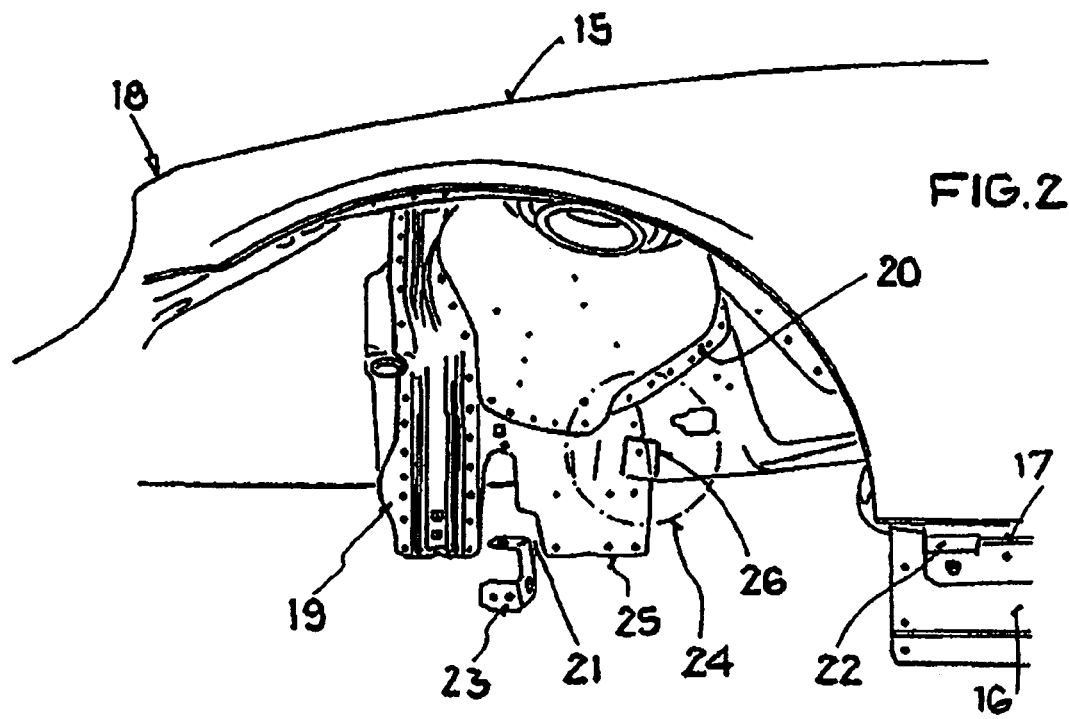
FIG. 2 is a side view of the left-hand front wheel area in a motor vehicle, with a weakness on a weld bead determined from the simulation.

FIG. 2 shows a bodywork front component 15 and a further component 16 which are assembled via an interface 17 to form a vehicle model element 18. Further components 19 and 20 are also modeled by means of finite element methods on the vehicle model element 18 in the area of the spring damper retaining dome on the vehicle, and are collated in the simulator. Elastic structures 22 and 23 are provided at the interfaces 17 and 21 and model the real conditions in terms of damping, elasticities and spring movements. A weakness 26 has been found between the components 20 and 25 in the area of the interface 24 during the calculation of the equipment strength using the simulator, where the simulator has calculated that the weld bead has a low dynamic strength.

Figure 3:
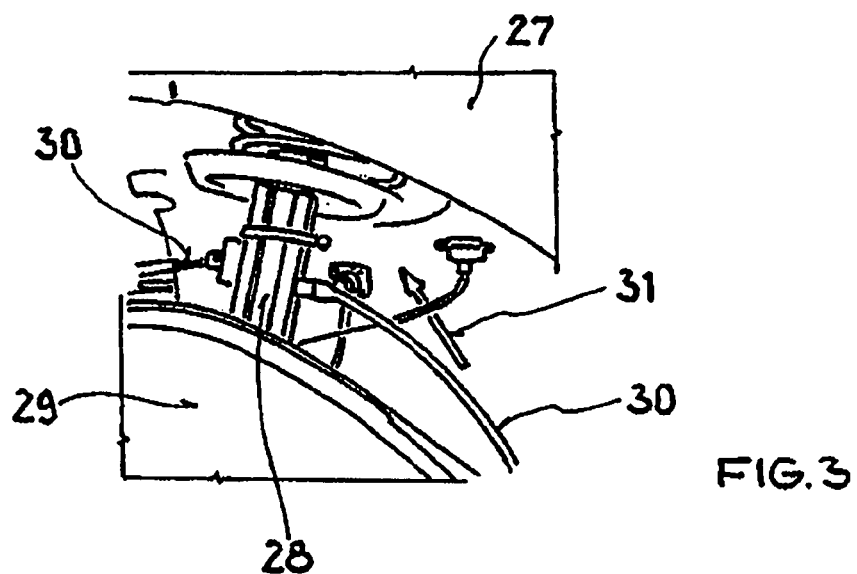
FIG. 3 is a side view of the wheel area of a real vehicle, which has completed a lengthy through-life test on a vehicle test rig and in which the weakness determined in FIG. 2 has broken.

FIG. 3 illustrates the comparable part of the real vehicle bodywork 27, which has been subjected to the real test rig loads via a movement controller 28. The movement controller 28 is attached to a real test rig 29 and is operated via a hydraulic system in order to make it possible to test the strength in response to the same uneven route section as that of the calculated model during the simulation. The movement controller 28 is supplied with the hydraulic fluid in an appropriate manner via hydraulic hoses 30. Once a sufficiently long-lasting dynamic strength test has been carried out, a crack was formed in the weld bead at the position 31, illustrated by the arrow, in this example. The results calculated in the simulator thus match the test results obtained on the real test rig 29.

The method for simulation and assessment of the life or dynamic strength of components of a vehicle is suitable for simulation of component dynamic strengths during the development phase of vehicles. The design of the individual components can thus be optimized at an early stage during the development of the vehicle, so that an optimally designed vehicle can be constructed in terms of the frequency-related or oscillating loads on the bodywork, on the engine or on the running gear.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for simulation and assessment of the life or dynamic strength of components of a vehicle, said method comprising:
   subdividing the vehicle into individual components;
   modeling the individual components by means of a finite element method;
   collating the finite element models of the individual components for simulation at interfaces;
   measuring or simulating externally introduced forces measured on the vehicle;
   calculating the forces which occur at the interfaces or at specific points within the components, to determine weakest points from the dynamic strength point of view in the overall model;
   modeling elastic structures at the interfaces in order to simulate actual flexibility or the dynamic transmission response of the vehicle structure; and
   taking into account in the vehicle model at least one of stiffness data and elastomer bearing data for the elastic structures; wherein,
   the vehicle model or model element is matched to the real vehicle in a plurality of iteration steps by introducing selected external forces on both the vehicle model or model element, and the real vehicle;
   the forces which occur at the interfaces or at specific points within the components on the vehicle are compared by means of elastokinematic measurements for the entire vehicle model or model element;
   elastokinematic characteristics, including at least inward-springing characteristic, damper characteristic, and spring constant of the various elastic structures in the vehicle model or model element, are then adapted, such that behavior of the vehicle model or model element emulates the real vehicle at the interfaces or at the specific points within the components, with respect to forces/time or movement/time; and
   the iteration steps are repeated in order at the same time to adapt the elastokinematic characteristics optimally for a plurality of interfaces or a plurality of points within the components.

2. A method for simulation and assessment of the life or dynamic strength of components of a vehicle, said method comprising:
   subdividing the vehicle into individual components;
   modeling the individual components by means of a finite element method;
   collating the finite element models of the individual components for simulation at interfaces;
   measuring or simulating externally introduced forces measured on the vehicle;
   calculating the forces which occur at the interfaces or at specific points within the components, to determine weakest points from the dynamic strength point of view in the overall model;
   modeling elastic structures at the interfaces in order to simulate actual flexibility or the dynamic transmission response of the vehicle structure; and
   taking into account in the vehicle model at least one of stiffness data and elastomer bearing data for the elastic structures; wherein,
   the externally introduced forces are applied to the vehicle via simulated movement controllers, which are clamped between a fixed foundation and the interfaces, and operate in a translational or rotational direction with respect to the interfaces of the vehicle model element or model; and
   required movement distances for the movement controllers are calculated from the simulation, to determine the real force and moment load on the vehicle model element or model.

3. The method as claimed in claim 2, wherein the position of the vehicle model or model element is defined in space by defining wheel holder interfaces at the movement controllers.

4. The method as claimed in claim 1, wherein deceleration or acceleration forces in the horizontal direction are applied to the vehicle model element or model by means of movement controllers.

5. The method as claimed in claim 2, wherein deceleration or acceleration forces in the horizontal direction are applied to the vehicle model element or model by means of movement controllers.

6. The method as claimed in claim 1, wherein the dynamic characteristics of the overall vehicle model or model element are first checked by simulating dynamic strength with a rigid vehicle model or model element, without any elastic structures, and thereafter successively connecting the elastic structures with the elasticity characteristics being optimized.

7. The method as claimed in claim 2, wherein the dynamic characteristics of the overall vehicle model or model element are first checked by simulating dynamic strength with a rigid vehicle model or model element, without any elastic structures, and thereafter successively connecting the elastic structures with the elasticity characteristics being optimized.

8. The method as claimed in claim 1, wherein the dynamic strength simulation results in data for component design by calculation of the magnitude and direction of the forces which are introduced at the interfaces or points on the components.

9. The method as claimed in claim 2, wherein the dynamic strength simulation results in data for component design by calculation of the magnitude and direction of the forces which are introduced at the interfaces or points on the components.

10. The method as claimed in claim 1, wherein the vehicle model element or model is used to produce a numerical life estimate for components of the vehicle, by assigning the material load capacity of the material in the vehicle model element or model for a simulated component.

11. The method as claimed in claim 2, wherein the vehicle model element or model is used to produce a numerical life estimate for components of the vehicle, by assigning the material load capacity of the material in the vehicle model element or model for a simulated component.

12. The method as claimed in claim 1, wherein the simulation is used in the development phase of the vehicle in order to test and to design the dynamic strength of the vehicle chassis, structure, engine bearing, drive train or bodywork.

13. The method as claimed in claim 2, wherein the simulation is used in the development phase of the vehicle in order to test and to design the dynamic strength of the vehicle chassis, structure, engine bearing, drive train or bodywork.

14. The method as claimed in claim 1, wherein the interfaces are provided in proximity to articulation points of the bodywork on its chassis or engine.

15. The method as claimed in claim 2, wherein the interfaces are provided in proximity to articulation points of the bodywork on its chassis or engine.

16. A software program product comprising a computer readable medium encoded with a program for causing a data processor to perform a method for simulation and assessment of the life or dynamic strength of components of a vehicle, wherein said method comprises:

subdividing the vehicle into individual components;

modeling the individual components by means of a finite element method;

collating the finite element models of the individual components for simulation at interfaces;

measuring or simulating externally introduced forces measured on the vehicle;

calculating the forces which occur at the interfaces or at specific points within the components, to determine weakest points from the dynamic strength point of view in the overall model;

modeling elastic structures at the interfaces in order to simulate actual flexibility or the dynamic transmission response of the vehicle structure; and taking into account in the vehicle model at least one of stiffness data and elastomer bearing data for the elastic structures; wherein, the vehicle model or model element is matched to the real vehicle in a plurality of iteration steps by introducing selected external forces on both the vehicle model or model element, and the real vehicle;

the forces which occur at the interfaces or at specific points within the components on the vehicle are compared by means of elastokinematic measurements for the entire vehicle model or model element;

elastokinematic characteristics, including at least inward-springing characteristic, damper characteristic, and spring constant of the various elastic structures in the vehicle model or model element, are then adapted, such that behavior of the vehicle model or model element emulates the real vehicle at the interfaces or at the specific points within the components, with respect to forces/time or movement/time; and the iteration steps are repeated in order at the same time to adapt the elastokinematic characteristics optimally for a plurality of interfaces or a plurality of points within the components.

17. A software program product comprising a computer readable medium encoded with a program for causing a data processor to perform a method for simulation and assessment of the life or dynamic strength of components of a vehicle, said method comprising:

subdividing the vehicle into individual components;

modeling the individual components by means of a finite element method;

collating the finite element models of the individual components for simulation at interfaces;

measuring or simulating externally introduced forces measured on the vehicle;

calculating the forces which occur at the interfaces or at specific points within the components, to determine weakest points from the dynamic strength point of view in the overall model;

modeling elastic structures at the interfaces in order to simulate actual flexibility or the dynamic transmission response of the vehicle structure; and taking into account in the vehicle model at least one of stiffness data and elastomer bearing data for the elastic structures; wherein, the externally introduced forces are applied to the vehicle via simulated movement controllers, which are clamped between a fixed foundation and the interfaces, and operate in a translational or rotational direction with respect to the interfaces of the vehicle model element or model; and required movement distances for the movement controllers are calculated from the simulation, to determine the real force and moment load on the vehicle model element or model.

* * * * *